United States Patent [19]
Keondjian

[11] Patent Number: 5,812,136
[45] Date of Patent: Sep. 22, 1998

[54] SYSTEM AND METHOD FOR FAST RENDERING OF A THREE DIMENSIONAL GRAPHICAL OBJECT

[75] Inventor: Servan Keondjian, London, England

[73] Assignee: Microsoft Corporation, Redmond, Wash.

[21] Appl. No.: 741,019

[22] Filed: Oct. 30, 1996

[51] Int. Cl.$^6$ .................................................. G06T 17/30
[52] U.S. Cl. ............................................................ 345/419
[58] Field of Search .................................... 345/418, 419, 345/420, 423, 424, 427

[56] References Cited

U.S. PATENT DOCUMENTS

| | | | |
|---|---|---|---|
| 5,497,452 | 3/1996 | Shimizu et al. | 345/420 |
| 5,504,845 | 4/1996 | Vecchione | 345/420 |
| 5,515,483 | 5/1996 | Ito et al. | 345/419 |
| 5,519,816 | 5/1996 | Pomerantz et al. | 345/419 |
| 5,557,710 | 9/1996 | Amdursky et al. | 345/420 |
| 5,666,472 | 9/1997 | Huddy | 345/419 |

Primary Examiner—Cliff N. Vo
Attorney, Agent, or Firm—Workman Nydegger Seeley

[57] ABSTRACT

A system and method for fast rendering of three dimensional graphics is presented. The system and method of the present invention renders an object using one or more encapsulated execute buffers. Each execute buffer comprises a vertex pool having a plurality of vertices which together define at least a portion of the object to be rendered. The vertex pool allows a large degree of vertex sharing to occur when rendering that portion of the object defined by the vertex pool and thus reduces the number of vertices that must be processed by a graphic subsystem in order to render that portion of the object. An encapsulated execute buffer also comprises an instruction stream that contains instructions for controlling the execution of the graphic subsystem with respect to the vertex pool so that the graphic subsystem will appropriately process the vertices of the vertex pool and render that portion of the object defined by the vertex pool. Graphics subsystems of the present invention are optimized to process encapsulated execute buffers.

47 Claims, 5 Drawing Sheets

SYSTEM AND METHOD FOR FAST RENDERING OF A THREE DIMENSIONAL GRAPHICAL OBJECT

BACKGROUND OF THE INVENTION

1. The Field of the Invention

The present invention relates to systems and methods for rendering of three dimensional graphical objects so that the object can be displayed on a computer screen or other two dimensional display device. More specifically, the present invention relates to systems and methods that both improve the speed of rendering three dimensional graphical objects and that reduce the amount of data needed to render three dimensional graphical objects.

2. The Prior State of the Art

Although computers were once a rather obscure oddity used primarily by scientists, today computers have become an integral part of mainstream society. Almost daily computers are changing the way that many people live, work, and play. The widespread proliferation of computers has opened up vast new uses and applications that were unheard of only a few short years before. Today, computers are not only a powerful tool used by many businesses, but also a source of recreation and enjoyment for millions.

As computers have evolved and been applied to an ever increasing array of uses, they have also evolved to become more intuitive for people to use. The somewhat arcane and cryptic character interfaces of the past have given way to an entirely new generation of graphical user interfaces that present information in an intuitive manner through various graphical objects. The move to graphical interfaces that present information in an intuitive manner has been facilitated by the ever increasing speed and capability of computers. Advances in technology have dramatically increased the ability of small inexpensive computers to quickly render and display two dimensional graphics. Unfortunately, advances in rendering and displaying three dimensional graphics have lagged behind.

Three dimensional graphics are central to many applications. For example, computer aided design (CAD) has spurred growth in many industries where computer terminals, cursors, CRT's and graphics terminals are replacing pencil and paper, and computer disks and tapes are replacing drawing vaults. Most, if not all, of these industries have a great need to manipulate and display three dimensional objects. This has lead to widespread interest and research into methods of modeling, rendering, and displaying three dimensional objects on a computer screen or other display device. The amount of computations needed to realistically render and display a three dimensional graphical object, however, remains quite large and true realistic display of three dimensional objects have largely been limited to high end systems. There is, however, an ever increasing need for inexpensive systems that can quickly and realistically render and display three dimensional objects.

One industry that has seen a tremendous amount of growth in the last few years is the computer game industry. The current generation of computer games are moving to three dimensional graphics in an ever increasing fashion. At the same time, the speed of play is being driven faster and faster. This combination has fueled a genuine need for the rapid rendering of three dimensional graphics in relatively inexpensive systems.

Rendering and displaying three dimensional graphics typically involves many calculations and computations. For example, to render a three dimensional object, a set of coordinate points or vertices that define the object to be rendered must be formed. Vertices can be joined to form polygons that define the surface of the object to be rendered and displayed. Once the vertices that define an object are formed, the vertices must be transformed from an object or model frame of reference to a world frame of reference and finally to two dimensional coordinates that can be displayed on a flat display device. Along the way, vertices may be rotated, scaled, eliminated or clipped because they fall outside the viewable area, lit by various lighting schemes, colorized, and so forth. Thus the process of rendering and displaying a three dimensional object can be computationally intensive and may involve a large number of vertices.

Prior art approaches to increase the speed of rendering and displaying three dimensional objects have started with the properties of the polygons used to render an object. A common polygon used in rendering three dimensional objects is a triangle. A triangle has many helpful properties that make it ideal for use in rendering three dimensional surfaces. A triangle is completely defined by three vertices and a triangle also uniquely defines a plane. Thus, many systems will use a plurality of triangles to render a three dimensional surface. If each triangle is passed separately to the graphic subsystem that renders the three dimensional object, then three vertices for each triangle must be passed and processed by the graphic subsystem. However, the number of vertices that must be passed and processed by the graphic subsystem can be reduced through "vertex sharing." Vertex sharing relies on a property of shared sides among triangles. Although it takes three vertices to define one triangle, it only takes four vertices to define two triangles if they share a common side. In order to take advantage of vertex sharing to reduce the number of vertices needed to render an object, pipelined systems have been developed that divide a three dimensional object into triangle strips that can then be processed and displayed efficiently. A general representation of a pipeline system processing a triangle strip is illustrated in FIG. 1.

Figure 1:
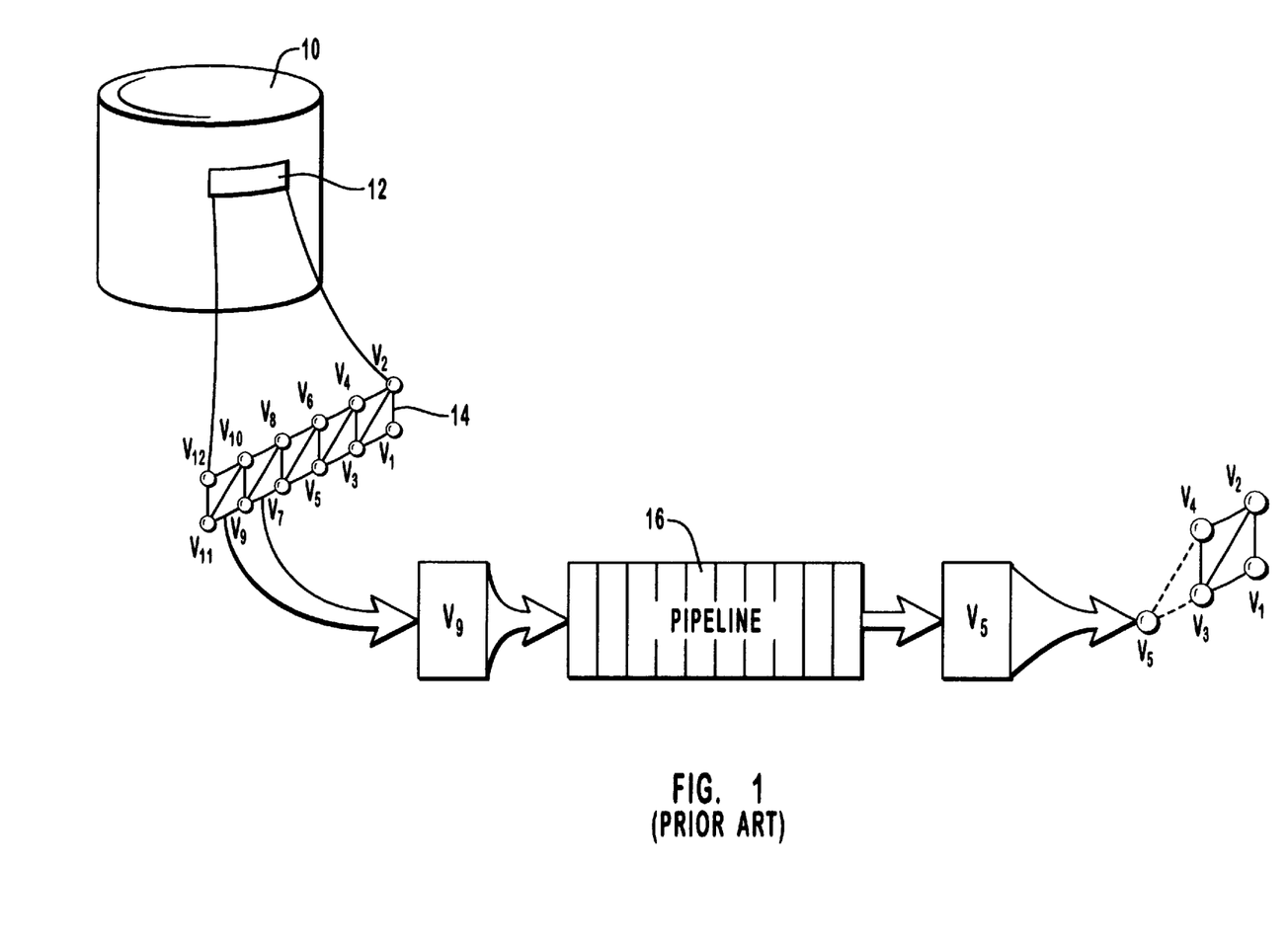
FIG. 1 is a diagram illustrating a prior art process that renders triangle strips.

In FIG. 1, when a three dimensional object 10 is to be rendered and displayed, the object is broken down into regions, such as region 12, that can be represented by a triangle strip, such as triangle strip 14. In FIG. 1, triangle strip 14 is formed from vertices $V_1$ through $V_{12}$. These vertices are then passed through pipelined system 16 which processes them in a pipelined fashion. Pipelined system 16 performs the transformations, lighting and rendering previously described. For example, such a pipelined system may take one vertex, perform any necessary coordinate transformations and scaling. The vertex may then be passed to the next stage in the pipeline where the vertex is lit. While the first vertex is being lit, another vertex can be transformed by the first stage in the pipeline. After lighting, the first vertex may be passed to a rendering stage where a new polygon is drawn. Thus, vertices are processed and passed to the next stage in the pipeline for further processing. The pipelined processing results in a situation where for each new vertex that exits the pipeline, a new triangle can be drawn. This is illustrated in FIG. 1 by vertex $V_5$ which allows a new triangle to be drawn as it exits pipelined system 16.

Figure 2:
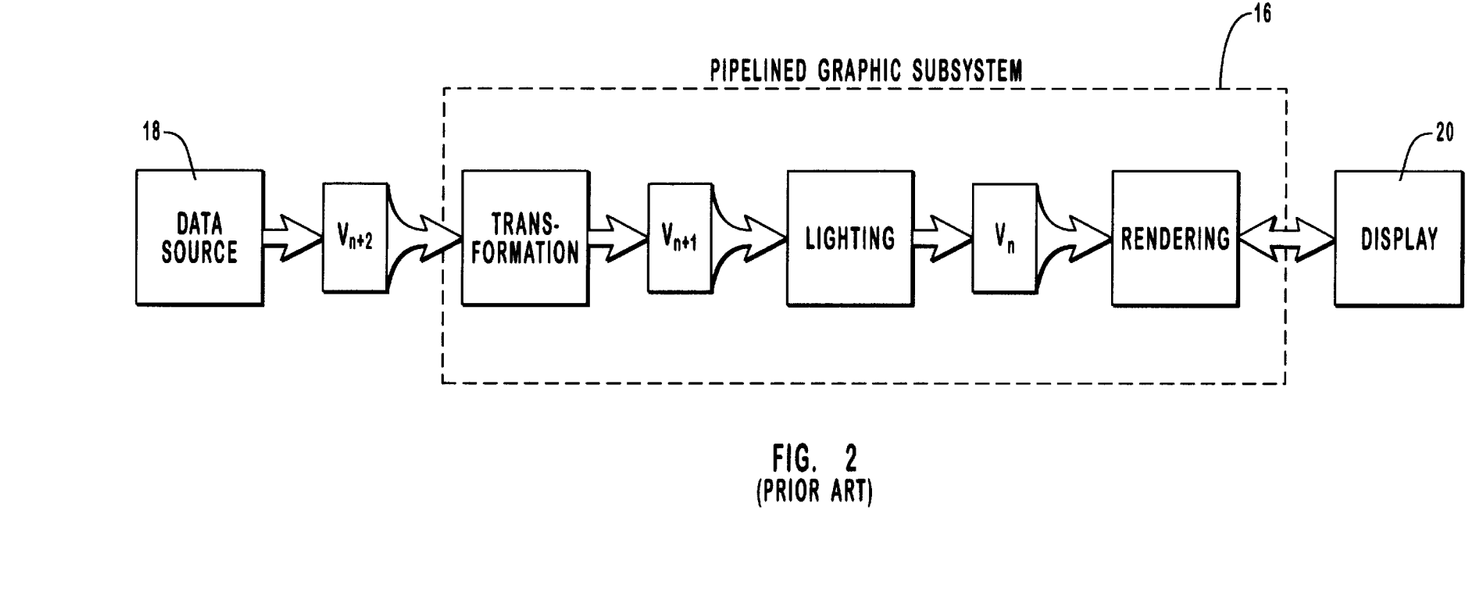
FIG. 2 is a diagram of prior art device implementing pipelined processing of a stream of vertices.

A general prior art system that implements such a pipelined system is illustrated in FIG. 2. In this system, data source 18 generates a stream of vertices defining triangle strips. These vertices are passed, one at a time, through pipelined graphic subsystem 16 where they are transformed, lit, and where triangles are rendered, one new triangle for each vertex processed. The rendered triangles are then displayed on display device 20.

This discussion highlights two hallmarks of prior art pipelined systems. First, the pipelined process always works one vertex at a time. For each vertex processed, a new triangle is drawn. Second, to maintain maximum performance, the pipeline must be provided with a steady stream of vertices. Breaks in the steady flow of vertices reduce performance.

Although the pipelined processes of the prior art have many advantages and can render and display triangle strips in an efficient fashion, many limitations still exist. For example, three dimensional objects which cannot easily be broken down into triangle strips are not efficiently rendered. Each time a triangle strip is terminated and a new triangle strip is begun, there is a delay before surfaces can be displayed while the pipeline is filled. Finally, the degree of vertex sharing available for prior art systems to reduce the number of vertices that must be sent to the graphic subsystem and processed is limited by the shape of the object to be rendered and by how efficiently the object can be defined by triangle strips. It would, therefore, be highly desirable to have a graphic subsystem that can take advantage of vertex sharing without the need to depend on triangle strips for rendering the object.

Another problem with prior art systems is that in order to achieve high speed rendering of triangle strips, hardware acceleration is generally required. It would, therefore, represent an advancement to be able to achieve high speed rendering of three dimensional objects in a way that can utilize hardware acceleration if it is available but can also utilize software emulation if necessary. Furthermore, it would be highly desirable to allow any combination of hardware and software emulation to coexist so that the degree of software emulation required can be tailored to the specific hardware available on the system.

SUMMARY AND OBJECTS OF THE INVENTION

The foregoing problems in the prior state of the art have been successfully overcome by the present invention, which is directed to a system and method for fast rendering of three dimensional objects. The system and method of the present invention are fully scalable in that the system and method can be implemented either completely in hardware, such as a special graphic chip or a group of chips, or may be implemented completely in software, or may be implemented in a combination of hardware and software. This allows a scalable approach whereby initially much of the functionality can be implemented using software emulation and, over time, more functionality can be implemented using hardware and less functionality implemented using software. Ultimately, it is anticipated that the functionality of the present invention will be implemented substantially or completely in hardware.

The present invention increases the speed of rendering a graphic object and reduces the number of vertices needed to render a graphic object substantially over any present prior art system. This capability is achieved by a dramatic departure from prior methods of rendering three dimensional objects. Rather than utilize a pipelined process and attempt to keep the pipeline full with a long uniform stream of vertices, the present invention creates encapsulated "execute buffers." Each execute buffer is then processed as a discrete unit by the graphic subsystem.

Execute buffers are formed by creating a "vertex pool" containing a plurality of vertices that define at least a portion of a three dimensional object that is to be rendered. The vertices are preferably selected so that as they are used to form polygons the vertices can be shared to a large extent when the vertices are used to form polygons. This is generally accomplished by selecting vertices in a substantially localized region to form the vertex pool. The vertices included in the vertex pool may define an arbitrary surface and are not limited to any particular shape such as a triangle strip.

Encapsulated with the vertex pool is an instruction stream. The instruction stream is used to control the execution of various graphical functions such as transformation, lighting, and rasterization. The instruction stream may utilize indices into the vertex pool in order to identify how that portion of the object defined by the vertex pool should be rendered. For example, the instruction stream may contain a plurality of draw triangle instructions that index which vertices in the vertex pool should be used to draw the triangles. Furthermore, the instruction stream may contain other instructions that set or modify various parameters used by one or more of the graphical functions. In summary, an encapsulated execute buffer contains a vertex pool defining an object or a portion of an object to be rendered and an instruction stream that controls how the vertex pool is used to render the object or portion thereof.

Forming encapsulated execute buffers achieves several advantages. The first advantage is that the number of vertices used to represent a given graphical object can be reduced significantly through vertex sharing. The instruction stream can also be optimized to achieve fast rendering of the object defined by the vertex pool by tailoring and organizing the instructions in batches in order to keep the number of changes to rendering parameters as low as possible. For example, if an object has two different textures, the instructions can be grouped to render all the triangles using the first texture, change the texture, and then render all the triangles that use the second texture.

The execute buffers of the present invention are processed by a graphic subsystem that has one or more of a transform module, a lighting module, and a rasterization module. The transform module may be used to perform scaling, rotation, and projection of a set of three dimensional vertices from their local or model coordinates to the two dimensional window that will be used to display the rendered object. The lighting module sets the color and appearance of a vertex based on various lighting schemes, light locations, ambient light levels, materials, and so forth. The rasterization module rasterizes or renders vertices that have previously been transformed and/or lit. The rasterization module renders the object to a rendering target which can be a display device or intermediate hardware or software structure that in turn moves the rendered data to a display device. Rasterization is performed so that if two triangles share two vertices, no pixel along the line joining the shared vertices is rendered twice.

The instruction stream of the execute buffer controls modules that implement graphical functions such as transformation, lighting, and rasterization through a parser. The parser decodes the instruction stream and generates control signals appropriate to the module needed to carry out the functions of the instruction stream. The modules use vertices from the vertex pool as directed by the parser.

The graphic subsystem of the present invention preferably also has an internal vertex buffer. The internal vertex buffer can be used as a location to place vertices that have been previously transformed and/or lit. The time needed to access the internal vertex buffer is typically very small since the internal vertex buffer is generally formed using a very fast memory. Using an internal vertex buffer may dramatically increase the speed of the present invention.

The graphic subsystem of the present invention also has a direct interface to the various modules. This allows direct access to the functions or information of the modules. In addition, parameters used by the various modules may be set directly rather than through the mechanism of the instruction stream. This direct interface may therefore be used when the functionality of the various modules are needed without the desire to render and display a three dimensional object. For example, a process needing transformation may use the functionality of the transform module through the direct interface without the need to create an encapsulated execute buffer. Rendering and displaying a three dimensional object is performed through the use of execute buffers in order to maximize the performance of the present invention.

Accordingly, it is a primary object of this invention to provide a system and method for fast rendering of three dimensional objects. Other objects of the present invention include: providing a system and method for fast rendering of three dimensional objects that is scalable in that any portion of the system and method may be implemented either in hardware or in software; providing a system and method for rendering of three dimensional objects that processes encapsulated execute buffers comprising a vertex pool and an instruction stream; and providing a system and method for rendering of three dimensional objects that allow access to the functions of the graphic subsystem either through a direct interface or through an encapsulated execute buffer.

Additional objects and advantages of this invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The following invention is described by using flow diagrams to illustrate either the structure or processing of a preferred embodiment to implement the system and method of the present invention. Using the diagrams in this manner to present the invention should not be construed as limiting of its scope. The present invention contemplates both methods and systems for fast rendering of three dimensional graphical objects. Embodiments of the present invention may comprise a general purpose computer with software, hardware, or a combination of both used to implement the present invention. A special purpose or dedicated computer such as a game platform may also be used to implement the present invention and all should be included within its scope.

Special purpose or general purpose computers used in the present invention may comprise standard computer hardware such as a central processing unit (CPU) or other processing means for executing program code means, computer readable media for storing program code means, a display or other output means for displaying or outputting information, a keyboard or other input means for inputting information, and so forth. Embodiments of the present invention may also comprise graphic subsystems that may be used to implement all or part of the present invention, as explained in greater detail below.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of the above should also be included within the scope of computer readable media. Executable instructions comprise, for example, at least instructions and possibly data which cause a general purpose computer, special purpose computer, or special purpose processing device to perform a certain function or group of functions.

Figure 3:
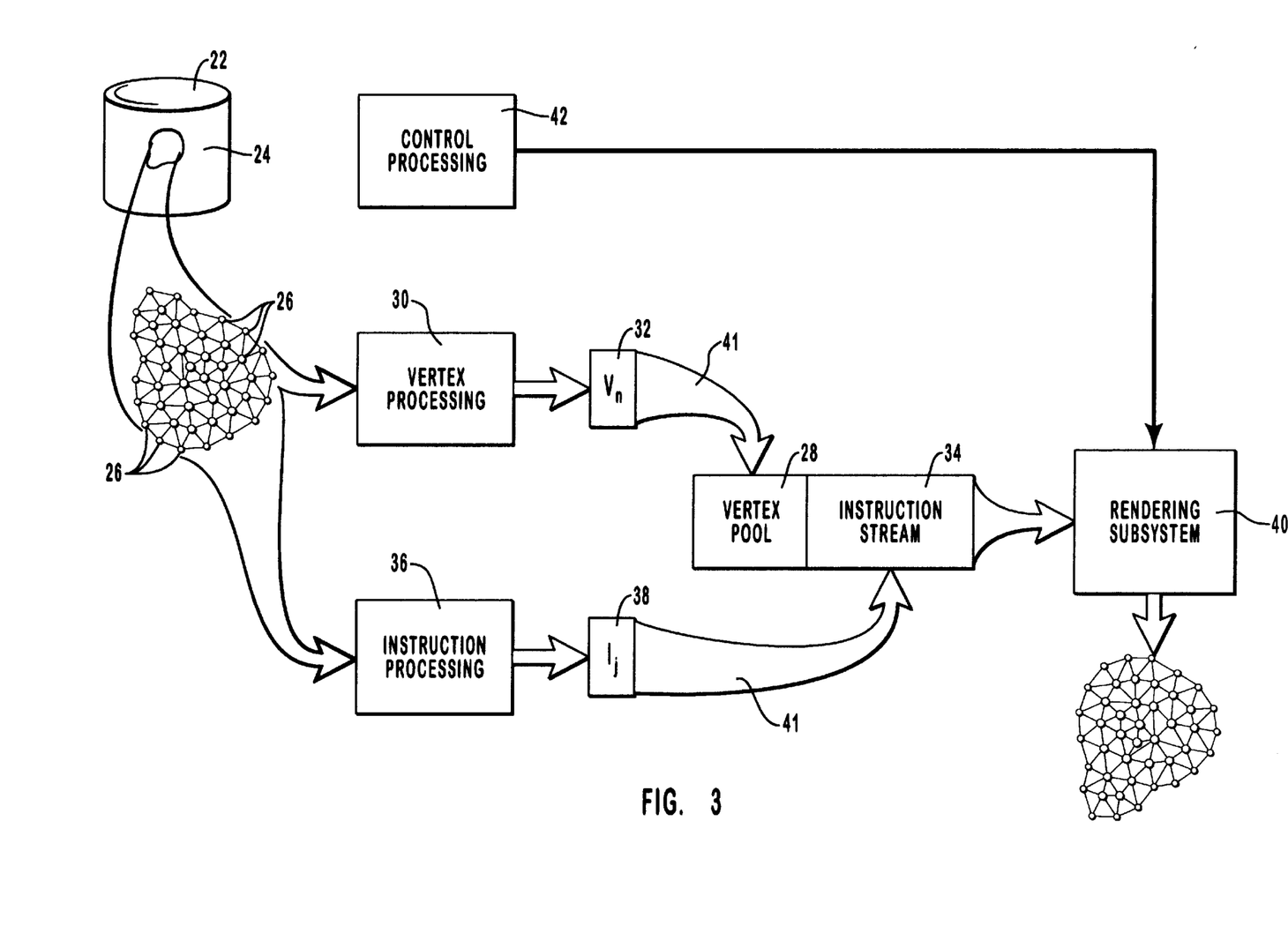
FIG. 3 is a diagram illustrating how encapsulated execute buffers are formed and used to render an object.

FIG. 3 presents a high level diagram illustrating a method of the present invention that is used to render a three dimensional graphic object. In FIG. 3, a three dimensional graphic object 22 represents the three dimensional object that is to be rendered. A region 24 is selected for rendering. As previously described, the surface of a three dimensional object can be represented by defining a plurality of vertices that define an object or a portion of an object to be rendered. In FIG. 3, region 24 is defined by a plurality of vertices 26. As illustrated in FIG. 3, triangles may be drawn using vertices 26 to define the surface of region 24. Thus, if vertices 26 are processed appropriately, region 24 can be rendered.

Embodiments of the present invention can comprise means for defining a vertex pool comprised of a plurality of vertices that together define a region to be rendered. In FIG. 3, such means is illustrated by vertex processing block 30. Vertex processing block 30 assembles vertices 26 into a vertex pool, illustrated in FIG. 3 as vertex pool 28. In FIG. 3, vertex processing block 30 takes each vertex, such as vertex 32, and places it into vertex pool 28.

The use of a vertex pool in the present invention has several advantages. For example, the use of a vertex pool facilitates vertex sharing among adjacent vertices in a region. Another benefit achieved through the use of a vertex pool is the ability to increase vertex sharing in an arbitrary region. In the prior art, vertex sharing was used to a limited extent when triangle strips were used to render the surface of an object. The present invention, however, extends this concept to an arbitrarily shaped region. In the present invention, there is no need to constrain regions to any particular shape since a vertex pool can contain any arbitrary region that is defined by a set of vertices. Thus, a vertex pool can dramatically reduce the number of vertices needed to define a particular region of a three dimensional object. Furthermore, the object can be broken down into arbitrarily shaped regions best suited to the shape of the three dimensional object.

A vertex pool, by itself, does not contain sufficient information to allow rendering of the region defined by the vertex pool. The graphic subsystem must have some indication how the vertices are to be utilized to render the region they define. The present invention, therefore, may comprise means for creating an instruction stream containing program code means for controlling execution of a graphic system that renders the object. In FIG. 3, such means is illustrated, for example, by instruction processing block 36. Instruction processing block 36 creates instruction stream 34. In essence, instruction stream 34 represents a miniature program that operates on vertex pool 28 through a graphic subsystem, such as graphic subsystem 40 of FIG. 3, in order to render the region defined by vertex pool 28.

In order to create an encapsulated execute buffer, embodiments of the present invention may comprise means for forming at least one encapsulated execute buffer by joining an instruction stream and a vertex pool to create a contained unit adapted for processing by a graphic subsystem, as for example graphic subsystem 40 of FIG. 3. In FIG. 3, the means for forming an execute buffer is illustrated by arrows 41. Any mechanism that places identified vertices and an instruction stream in an encapsulated execute buffer can be used for such means.

Once instruction stream 34 is joined to vertex pool 28, the two form an encapsulated "execute buffer" that represents a self-contained unit adapted for processing by a graphic subsystem, such as graphic subsystem 40. Graphic subsystem 40 is, therefore, preferably adapted to processing encapsulated execute buffers in a highly efficient fashion. Thus, contrasting the present invention with the pipelined line structures of the prior art, we see that the present invention is designed to produce encapsulated execute buffers that are processed in discrete units by graphic subsystem 40.

Although further details of the types of instructions that may be a part of instruction stream 34 are presented below, it is apparent from the above discussion that instruction stream 34 can comprise any instructions useful or desirable for causing graphic subsystem 40 to render region 24 from vertex pool 28. For example, instruction stream 34 may comprise program code means for setting various parameters used by graphic subsystem 40 to render region 24 from vertex pool 28. Such parameters may include, for example, matrices used in coordinate transformations, rotation, scaling, and the like, various lighting parameters such as the number of lights, the type of lights, the ambient light levels, the lighting scheme to be used, and so forth, and various parameters used to rasterize the surface such as texture parameters, transparency parameters, and interpolation methods. Instruction stream 34 may also comprise program code means that cause various transformation, lighting, or rasterization functions to be performed. In short, instruction stream 34 may comprise program code means to fully control the operation of graphic subsystem 40.

Once an execute buffer is created, it must be processed by the graphic subsystem. Embodiments of the present invention may therefore comprise means for causing an execute buffer to be processed by the graphic subsystem. By way of example, and not limitation, such means is illustrated in FIG. 3 by control processing block 42. This block may trigger processing of an execute buffer. As explained in greater detail below, this may be accomplished through a direct interface to graphic subsystem 40. Such a direct interface may also allow access to various other features and functions of graphic subsystem 40.

Figure 4:
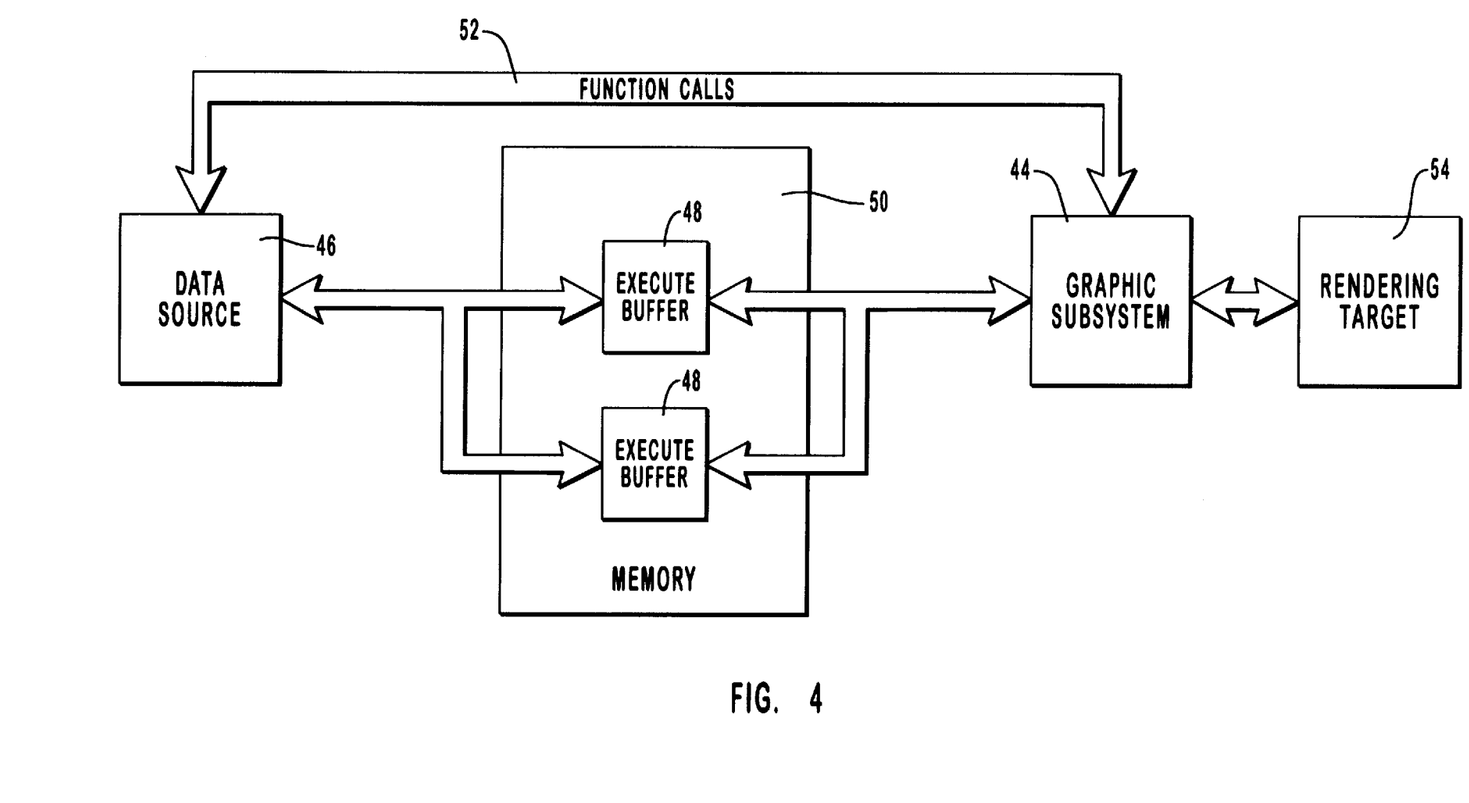
FIG. 4 is a top level block diagram of one embodiment of the present invention.

Referring now to FIG. 4, another embodiment of the present invention is presented. This embodiment may be used to implement the method that has been illustrated in FIG. 3 and described above. Embodiments within the present invention may comprise means for implementing one or more graphical functions such as coordinate transformation, object lighting, and rasterizing. In FIG. 4, such means is illustrated, for example, by graphic subsystem 44. Graphic subsystem 44, like graphic subsystem 40 of FIG. 3, represents only an example of the types of graphic subsystems that may be used with the present invention. One embodiment of a graphic subsystem suitable for use with the present invention is presented in greater detail below. In summary, however, graphic subsystem 44 is a graphic subsystem adapted for processing encapsulated execute buffers in order to render a three dimensional object. As described previously, graphical functions that may be needed or useful in rendering three dimensional graphic objects include, but are not limited to, functions for coordinate transformation including scaling, rotation, clipping, or otherwise transforming coordinates or vertices from a local object or model coordinate frame to the two dimensional coordinates where rendered pixels can be displayed. Other functions may include various lighting functions such as defining the type, location, orientation, or other parameters of lights used to light the three dimensional scene that is to be rendered, the ambient light level, the material that the object is formed from, the type of lighting scheme used, or other types of lighting parameters. Finally, functions useful for rendering three dimensional graphic objects may include various raster type functions such as defining textures for various surfaces, defining the transparency for various surfaces, defining various methods for interpolating useful in drawing a line from one vertex to another vertex, and so forth. Graphic subsystem 44 may implement all or some of these functions. Thus, graphic subsystem 44 may also comprise program code means to emulate various graphical functions or hardware that directly implements various graphical functions. Thus, graphic subsystem 44 may be implemented entirely in hardware, entirely in software, or a combination of hardware and software.

As previously described in conjunction with FIG. 3, embodiments within the present invention may comprise means for defining at least one vertex pool comprised of a plurality of vertices which together define at least a portion of the object to be rendered. Embodiments may also comprise means for forming at least one encapsulated execute buffer by joining together an instruction stream with the vertex pool so that the encapsulated execute buffer may serve as a contained unit adapted for processing by means for implementing various graphical functions, such as graphic subsystem 44. In FIG. 4, the means for defining a vertex pool and the means for forming an encapsulated execute buffer may be implemented as part of data source 46. Thus, data source 46 may implement vertex processing block 30, instruction processing block 36, and control processing block 42, of FIG. 3. Data source 46 of FIG. 4 is intended to represent a generic process that desires to render a three dimensional graphic object using the method and system of the present invention. Thus, data source 46 will perform such functions as forming a vertex pool that comprises a plurality of vertices which together define at least a portion of the object to be rendered. Data source 46 will also join to the vertex pool an instruction stream comprising program code means for controlling the execution of various graphical functions in graphic subsystem 44 with respect to the vertex pool in order to render the graphic object defined by the vertex pool. The vertex pool and instruction stream together form an encapsulated execute buffer.

In FIG. 4, encapsulated execute buffers formed by data source 46 are represented by execute buffers 48. As illustrated in FIG. 4, data source 46 may generate a plurality of execute buffers in order to render a single graphical object or a single execute buffer may be sufficient to render the object. The number of execute buffers needed to render a three dimensional object will largely depend upon the size of the vertex pool in each execute buffer with respect to the number of vertices needed to define the desired object. The details of how the size of a vertex pool is selected is described in greater detail below.

Execute buffers are encapsulated or contained units that are processed by means for implementing one or more graphical functions, as for example, graphic subsystem 44. In FIG. 4, encapsulated execute buffers 48 are produced by data source 46 and then processed by graphic subsystem 44. Execute buffers 48 must, therefore, be accessible both by data source 46 and by graphic subsystem 44. While it would be possible to pass execute buffers 48 from data source 46 to graphic subsystem 44, it is generally more efficient to store execute buffers 48 in a location that is accessible both by data source 46 and graphic subsystem 44. Graphic subsystem 44 may then retrieve information from execute buffer 48 without having to copy execute buffer 48 to a location where it may be accessed. Embodiments within the scope of this invention may, therefore, comprise means for storing execute buffers so that they are accessible both by the process creating the execute buffer and the means for implementing one or more graphical functions, such as graphic subsystem 44. By way of example, and not limitation, in FIG. 4 such means is illustrated by shared memory 50.

Embodiments within the scope of the present invention may also comprise means for directly accessing the means for implementing one or more graphical functions. In FIG. 4, such means for directly accessing is illustrated by function calls 52. Function calls 52 is used in FIG. 4 to illustrate a mechanism whereby data source 46 directly accesses the functionality contained within graphic subsystem 44. As described in greater detail below, graphic subsystem 44 may comprise a direct interface that allows direct access to various internal functions and parameters. This direct interface may be accessed, for example, by function calls 52. This direct interface provides a separate mechanism of accessing various functions in graphic subsystem 44 outside of the access provided by the instruction stream in encapsulated execute buffer 48.

As previously described, graphic subsystem 44 is an example of means for implementing various graphical functions such as coordinate transformation, object lighting, and rasterizing. In certain circumstances, it may be more efficient to access certain functionality of graphic subsystem 44 through a direct interface rather than through the mechanism of an execute buffer. For example, the direct interface may provide the capability to directly set various parameters used by one or more of the functions for transformation, lighting, or rasterizing. As previously explained, coordinate transformation generally requires one or more matrices to perform transformation, rotation, scaling, and other functions. In certain circumstances, it may be desirable to set these type of parameters directly through a direct interface rather than through the instruction stream of an encapsulated execute buffer. Function calls 52 allows such parameters to be set directly.

The direct interface of graphic subsystem 44 accessed through function calls 52 may provide access to internal graphical functions. For example, if data source 46 wished to transform a set of vertices from one coordinate frame to another but yet did not wish to render an object, then function calls 52 may provide access to the internal transformation function of graphic subsystem 44 and may return the result of the transformation to data source 46 rather than processing the transformed vertices internally in order to further rendering of an object. Similar function calls may be included for any of the graphical functions implemented by graphic subsystem 44.

As previously explained, graphic subsystem 44 may comprise a rasterizing module or rasterizing functions that produce a rendered object in the form of pixels that are ready to be displayed. Graphic subsystem 44 may, therefore, interface with a rendering target, such as rendering target 54. Rendering target 54 may be a display device so that objects rendered by graphic subsystem 44 are directly transferred to the display device. In the alternative, rendering target 54 may be an intermediate device or structure where rendered pixels are stored and then later transferred to a display device or other output device. For example, in one embodiment rendering target 54 is a direct draw surface such as that described in copending U.S. patent application Ser. No. 08/641,014, filed on Apr. 25, 1996, in the name of Eric Engstrom and Craig Eisler, entitled DISPLAY DEVICE INTERFACE INCLUDING SUPPORT FOR GENERALIZED FLIPPING OF SURFACES, incorporated herein by reference.

Figure 5:
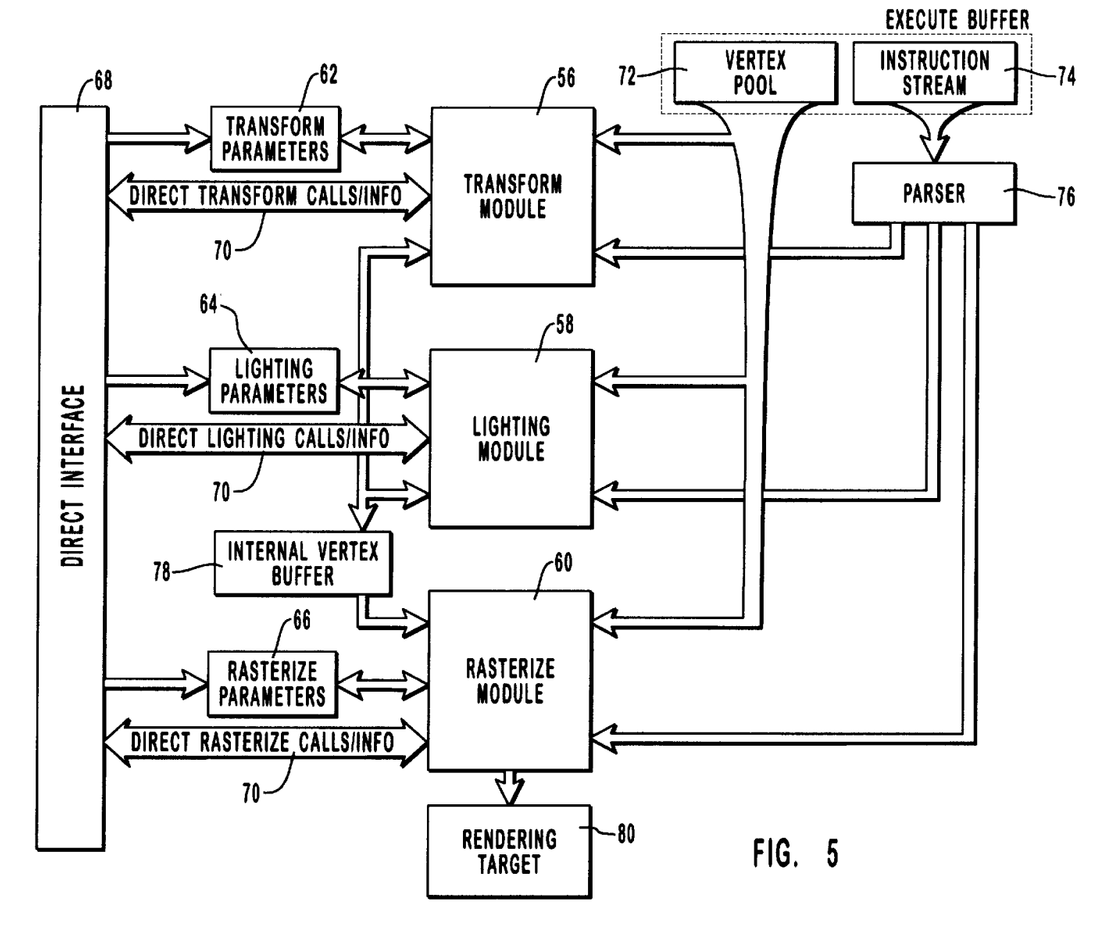
FIG. 5 is a block diagram of a graphic subsystem of the present invention.

Referring next to FIG. 5, the details of a suitable graphic subsystem for the present invention is presented. As previously described, embodiments within the scope of this invention may comprise means for implementing one or more graphical functions such as coordinate transformation, object lighting, and rasterizing. Also as previously described, graphic subsystem 44 of FIG. 4 and graphic subsystem 40 of FIG. 3 represent two examples of such means for implementing. In FIG. 5, the details of a graphic subsystem, such as graphic subsystem 44 of FIG. 4, suitable for the present invention are presented. In FIG. 5, means for implementing one or more graphical functions is illustrated, for example, by transform module 56, lighting module 58, and rasterize module 60. Embodiments within the scope of this invention may implement one or more of these modules depending on the targeted application. For complete functionality within graphic subsystem 44, it is generally preferred that all three modules be implemented. Furthermore, the modules can be implemented using software, hardware, or a combination of both.

Transformation module 56 is responsible for receiving vertices in model coordinates and transforming the three dimensional vertices from their model coordinates to the two dimensional window where they will ultimately be displayed. In order to achieve the transformation, embodiments within the scope of this invention may use standard transform parameters such as a view port, a viewing matrix, a world matrix, a projection matrix, and so forth. Together, parameters such as these allow geometric transformations to express the location of an object relative to another object, rotate, clip, size various objects, as well as change viewing positions, directions, and perspectives in the three dimensional scene. Coordinate transformations that transform the vertex pool of three dimensional vertices from their model coordinates to the two dimensional window where they will be displayed typically involve one or more of translation, rotation, and scaling. The fundamentals of three dimensional graphic transformation are well known in the art and need not be explained further herein. The various transformation parameters used by transform module 56 are stored in transform parameters block 62. Transform parameters block 62 stores all parameters needed for transform module 56 to achieve its desired objective.

Lighting module 58 is responsible for lighting vertices according to various lighting parameters. The lighting parameters are stored in lighting parameters block 64. Lighting parameters block 64 may contain, for example, a stack of the current lights along with their associated parameters, the ambient light level, and a material. Lighting module 58 may also use various types of lighting schemes and shading modes, as for example, a flat shade mode, a Phong shade mode, or a Gouraud shade mode. A plurality of lighting models may also be used by lighting module 58. For example, monochromatic and RGB lighting models may be used. The various lighting and shading models as well as various other parameters of the lights themselves will determine how a vertex should be lit, as is well known in the art. In short, lighting module 58 may implement any of the various techniques used in the art to light a three dimensional graphic scene.

Rasterize module 60 is responsible for using rendering primitives to render or rasterize vertices that have been previously transformed and/or lit. Rasterize module 60 uses parameters stored in rasterize parameters block 66 to achieve its functions. For example, rasterize module 60 will be responsible for joining transformed and lit vertices in order to form the polygons, such as triangles, that are used to render the surface defined by the vertex pool of an encapsulated execute buffer. The parameters used by rasterize module 60 may include, for example, parameters describing the texture of a surface, parameters describing the transparency of a surface, or parameters describing the interpolation method used to plot lines between vertices. Rasterization module 60 is preferably optimized so that no pixel along the line joining shared vertices is rendered twice. Furthermore, in certain implementations only triangles whose vertices are traversed in a certain order, as for example clockwise, are visible while backward or backfacing triangles that are traversed in the opposite direction, as for example counterclockwise, are not visible. The rasterized module may also be optimized to plot only those triangles whose vertices are traversed in the proper orientation.

As previously described, embodiments within the present invention may comprise means for directly accessing the means for implementing one or more graphical functions, so that one or more graphical functions may be accessed directly. By way of example, and not limitation, in FIG. 5 such means for directly accessing is illustrated by direct interface 68. As explained previously, in certain embodiments it may be desirable to allow direct access to various parameters and functions implemented by a graphic subsystem of the present invention. Such a direct interface may be used, for example, to set various parameters. In FIG. 5, direct interface 68 may be used to set any parameters used by transform module 56, lighting module 58, or rasterize module 68. This is illustrated by the direct access into transform parameter block 62, lighting parameter block 64, and rasterize parameter block 66.

The functions of transform module 56, lighting module 58, and rasterize module 60 may also be accessed directly through direct interface 68. This is illustrated in FIG. 5 by direct calls/info arrows 70. As previously explained, it may be desirable to give outside access to the functions implemented in transform module 56, lighting module 58, and rasterize module 60. In such an embodiment, it would be desirable to have function calls or other mechanisms to access the functionality of these modules. Similarly, status queries may be useful and may also be implemented in direct interface 68. In such status queries, various modules may respond with various types of status information such as the current parameters used by the module, the current status of the module, debug information, or any other type of information that would be useful or desirable. Finally, direct interface 68 may be used to implement a means for causing execute buffers to be processed by a graphic subsystem. This may be an execute instruction or flag sent via the direct interface.

The primary function of the graphic subsystem, as for example graphic subsystem 44 of FIG. 4, is to process encapsulated execute buffers in order to render three dimensional objects. Embodiments within the scope of this invention, therefore, comprise means for accessing and retrieving information stored in an encapsulated execute buffer. As previously described, encapsulated execute buffers are formed by joining together at least one vertex pool comprised of a plurality of vertices which together define at least a portion of an object to be rendered and an instruction stream comprising program code means for controlling means for implementing one or more graphical functions such as coordinate transformation, object lighting, and rasterizing. In FIG. 5, the means for accessing and retrieving the information stored in an encapsulated execute buffer is illustrated by vertex pool 72 and instruction stream 74. Vertex pool 72 is the information stored in the vertex pool of an encapsulated execute buffer. Instruction stream 74 are the instructions of an encapsulated vertex pool. The means for accessing and retrieving information stored in an encapsulated execute buffer may comprise, for example, an interface unit that goes out and reads a block of shared memory in order to retrieve the information. This would be useful in an embodiment such as that illustrated in FIG. 4 where encapsulated execute buffers 48 are stored in shared memory 50. As another example, it would also be possible to implement the means for accessing and retrieving information stored in an encapsulated execute buffer as an incoming queue where execute buffers are received and placed in the queue until they can be processed. As previously explained, however, it may be more desirable to store execute buffers in an shared memory rather than to transfer the information in an execute buffer to a location, such as a queue, where it can be stored until it is processed. The implementation for the means for accessing and retrieving the information stored in an encapsulated execute buffer will be dependent upon the application selected and the mechanism used by the graphic subsystem to communicate with a data producer or data source and receive encapsulated execute buffers from the data source.

Since an encapsulated execute buffer comprises an instruction stream containing program code means for controlling means for implementing graphical functions, embodiments of the present invention comprise means for decoding the instruction stream and for controlling the means for implementing various graphical functions. In FIG. 5, the means for decoding the instruction stream and controlling the means for implementing graphical functions is illustrated, for example, by parser 76. Parser 76 is responsible for decoding instruction stream 74 and for creating appropriate control signals to control one or more of transform module 56, lighting module 58, and rasterize module 60 in response to the decoded instruction stream in order to render the object defined by vertex pool 72. Parser 76 must, therefore, recognize the instructions of instruction stream 74 and be able to control the various modules in response to the instructions in order to achieve and implement the desired function of the instructions. Like other functions of the graphic subsystem, parser 76 may be implemented in hardware, software, or a combination of each.

The instructions of instruction stream 74 may comprise a variety of formats and any format is suitable as long as parser 76 can decode the format and generate the appropriate control signals. In one embodiment, an instruction of instruction stream 74 comprises an opcode and associated data. For example, an instruction to draw a triangle using three vertices of the vertex pool may comprise an opcode that is decoded by parser 76 to be "draw triangle" and three associated pieces of data representing indices into the vertex pool in order to identify the three vertices of the vertex pool that should be used to draw the triangle.

The instruction set that defines all possible instructions that can be used by instruction stream 74 may comprise instructions falling into three general classifications. One class of instructions set the state of the various modules. For example, certain instructions may set the state of transform module 56. Other instructions may set the state of lighting module 58. Still other instructions may set the state of rasterized module 60. Setting the state of a module may comprise, for example, setting various parameters in an associated parameter block. Thus, certain instructions may set parameters in transform parameter block 62, other instructions may set parameters in lighting parameter block 64, and still other instructions may set parameters in rasterized parameter block 66. For this class of instructions, the opcode portion can identify what parameters should be set and the data portion may comprise the parameter data itself. As an alternative, the data portion of the instruction may comprise a pointer or handle that will allow the parameter data to be obtained or accessed.

A second class of instructions are instructions that use the various modules directly to act on one or more vertices. For example, an instruction may direct transform module 56 to perform coordinate transformation on one or more vertices of vertex pool 72. Similarly, other instructions may be directed to lighting module 58 and rasterized module 60 in order to access the functionality provided by the appropriate module.

A final class of instructions may control the execution flow of instruction stream 74. For example jump instructions, and conditional jump instructions would fall into this class. Such functions may be useful in generating an optimized instruction stream.

The graphic subsystem of the present invention may be optimized to process encapsulated execute buffers. Conceptually, processing of encapsulated execute buffers may be summarized as follows. Parser 76 begins decoding instruction stream 74 beginning with the first instruction. The instruction stream may direct that vertices within vertex pool 72 are processed first by transform module 56. This module reads vertices from vertex pool 72 and transforms them using the state information set up for transform module 56. Clipping can be enabled during this process so as to generate additional clipping information by using viewport parameters to eliminate those vertices that fall outside the visible area. Whole execute buffers can be rejected at this phase if the entire vertex pool lies outside of the viewable area. After the vertices are transformed, instruction stream 74 may use lighting module 58 to add color to the vertices according to lighting instructions and various parameters of lighting parameter block 64.

The results of the transformation made by transform module 56 and lighting made by lighting module 58 may be placed in an internal vertex buffer, such as internal vertex buffer 78. Embodiments of the present invention can, therefore, comprise means for forming an internal vertex buffer. Internal vertex buffer 78 of FIG. 5 is but one example of such means. Internal vertex buffer 78 may dramatically increase the speed of processing execute buffers. Internal vertex buffer 78 is preferably formed from fast memory and resides where it can be accessed very quickly by the various modules. For example, if the various modules are implemented in software, internal vertex buffer 78 may be implemented using on chip cache memory of the CPU or other processing means of a computer. If the various modules are implemented using hardware, internal vertex buffer 78 may be on chip cache memory or fast memory that is accessible by the various hardware modules.

After vertices in vertex pool 72 have been transformed and/or lit by transform module 56 and lighting module 58, the vertices may be rendered by rasterized module 60 and sent to rendering target 80 as directed by rendering primitives found in instruction stream 74. Such rendering primitives can include, for example, a "draw triangle" instruction which draws a triangle using transformed and lit vertices from vertex pool 72. Other primitives may include such things as plotting points, drawing lines, drawing other types of polygons, and the like. As illustrated in FIG. 5, rasterize module 60 may read the transformed and/or lit vertices from internal vertex buffer 78. Again, if internal vertex buffer 78 is implemented using fast memory, then the process of retrieving the transformed and lit vertices in order to render the object using various primitives may be dramatically accelerated. Finally, rendering target 80 may be any type of device or structure adapted to receive the rendered pixels. For example, rendering target 80 may be a display device or other type of output device or rendering target 80 may be an intermediate device or structure such as direct draw surface, as previously described.

Several properties and characteristics of execute buffers should be noted. For example, increasing the size of a vertex pool increases the amount of vertex sharing and decreases the number of vertices that must be processed by a graphic subsystem in order to render the object defined by the vertices in the vertex pool. As the vertex pool increase in size, the number of vertices needed to represent an object may be decreased by as much as a factor of two over prior art devices. Thus, there is a desire to increase the size of a vertex pool in order to increase the vertex sharing and decrease the number of vertices that must be processed to render an object. On the other hand, using an internal vertex buffer, such as internal vertex buffer 78 of FIG. 5, can dramatically increase the speed of execution by reducing the time needed to access transformed and lit vertices. If internal vertex buffer 78 is formed from on chip cache memory, the access time is dramatically reduced over access time for external memory. Thus, it has been found that a good rule of thumb is to limit the size of the vertex pool to the number of vertices that can be contained within an internal vertex buffer, such as internal vertex buffer 78, if one is available in the implementation. Matching the vertex pool of an execute buffer to the size of an internal vertex buffer implemented using fast memory has been shown to dramatically increase the speed of processing execute buffers.

In order to aid a data source program, as for example data source 46 of FIG. 4, to decide how large to make a vertex pool in an execute buffer, it may be desirable to provide a function call or other mechanism whereby a data source can identify the maximum desirable size of a vertex pool. The graphic subsystem can therefore return, in response to a query or other request, the size of the internal vertex buffer should there be one. If the graphic subsystem is implemented partially or wholly in software, then the call can return the size of internal cache memory of the CPU that may be used and allocated for an internal vertex buffer.

As previously indicated, embodiments within the present invention may be implemented completely in hardware, completely in software, or in a combination of hardware and software. For example, the graphic subsystem presented in FIG. 5 may represent a complete hardware implementation, a complete software implementation, or a combination of hardware and software. In this way, various systems may be able to run identical software by emulating in software that portion of the hardware that does not currently exist on the system such an implement will still utilize any hardware that does reside on the system. For example, perhaps rasterize module 60 and internal vertex buffer 78 are implemented in hardware but transform module 56, and lighting module 58 are implemented and emulated in software. On another system that has more hardware capability installed, perhaps transform module 56, lighting module 58, and rasterize module 60 are all implemented in hardware. As long as the structure is consistent, any combination of hardware and/or software may be used to implement the present invention.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of rendering and displaying a three dimensional object using a computer system having a central processing unit (CPU) and a means for implementing one or more graphical functions such as coordinate transformation, object lighting and rasterizing, the method comprising the steps of:

said CPU defining at least one vertex pool comprised of a plurality of vertices which together define at least a portion of the object to be rendered;

said CPU forming at least one encapsulated execute buffer by joining together an instruction stream with said at least one vertex pool so that the encapsulated execute buffer serves as a contained unit adapted for processing by said means for implementing, and wherein said instruction stream contains program code means for controlling the execution of one or more of said graphical functions with respect to said at least one vertex pool; and said CPU causing said at least one execute buffer to be processed by said means for implementing so at to graphically render said three dimensional object.

2. A method of rendering and displaying a three dimensional object as recited in claim 1 wherein said at least one vertex pool is sized such that when said at least one vertex pool is processed by said means for implementing, the vertices of said at least one vertex pool can be contained within an internal vertex buffer of said means for implementing.

3. A method of rendering and displaying a three dimensional object as recited in claim 1 wherein said CPU chooses the vertices that are used to define said at least one vertex pool from a substantially localized area in order to increase the amount of vertex sharing among vertices in said vertex pool.

4. A method of rendering and displaying a three dimensional object as recited in claim 1 wherein said CPU creates a plurality of encapsulated execute buffers so that as one execute buffer is being processed by said means for implementing, another buffer is being created.

5. A method of rendering and displaying a three dimensional object as recited in claim 1 wherein said instruction stream is organized to minimize the number of times that the state of said means for implementing is changed by changing at least one parameter used by said means for implementing to perform one or more graphical functions.

6. A method of rendering and displaying a three dimensional object as recited in claim 1 wherein said instruction stream comprises program code means that change the state of said means for implementing by changing at least one parameter used by said means for implementing to perform one or more graphical functions.

7. A method of rendering and displaying a three dimensional object using a computer system having a central processing unit (CPU) and a means for implementing one or more graphical functions such as coordinate transformation, object lighting and rasterizing, the method comprising the steps of:

said CPU defining at least one vertex pool comprised of a plurality of vertices which together define at least a portion of the object to be rendered, said CPU selecting said plurality of vertices from at least one substantially localized area so as to increase the vertex sharing among the vertices of said at least one vertex pool;

said CPU forming at least one encapsulated execute buffer by joining together an instruction stream with said at least one vertex pool so that the encapsulated execute buffer serves as a contained unit adapted for processing by said means for implementing, and wherein said instruction stream contains program code means for controlling the execution of one or more of said graphical functions with respect to said at least one vertex pool; and said CPU causing said at least one execute buffer to be processed by said means for implementing so at to graphically render said three dimensional object.

8. A method of rendering and displaying a three dimensional object as recited in claim 7 wherein said at least one encapsulated execute buffer is formed in memory shared by said CPU and said means for implementing such that after said encapsulated execute buffer is formed in said memory, said means for implementing can retrieve the information of said at least one encapsulated execute buffer from said memory.

9. A method of rendering and displaying a three dimensional object as recited in claim 8 wherein said instruction stream comprises program code means that changes the state of said means for implementing by changing at least one parameter used by said means for implementing to perform one or more graphical functions.

10. A method of rendering and displaying a three dimensional object as recited in claim 9 wherein said instruction stream comprises indices into said at least one vertex pool so that said instruction stream can identify vertices from said at least one vertex pool to operate on.

11. A method of rendering and displaying a three dimensional object as recited in claim 10 wherein said at least one vertex pool is sized such that when said at least one vertex pool is processed by said means for implementing, the vertices of said at least one vertex pool can be contained within an internal vertex buffer of said means for implementing.

12. In a computer system comprising a central processing unit (CPU) and a graphic subsystem comprising one or more of means for coordinate transformation of vertices defining at least a portion of a graphical object, means for lighting said vertices and means for rasterizing, a method of rendering a three dimensional graphical object comprising the steps of:

said graphic subsystem establishing access to an encapsulated execute buffer so that vertices and program code means can be retrieved therefrom, said encapsulated execute buffer being formed by joining together at least one vertex pool comprised of a plurality of vertices which together define at least a portion of a three dimensional object to be rendered and an instruction stream comprising program code means for controlling said one or more of means for coordinate transformation, means for lighting and means for rasterizing;

said graphic subsystem retrieving program code means from said instruction stream; and said graphic subsystem generating in response to said retrieved program code means appropriate controls to cause said one or more of means for coordinate transformation, said means for lighting, and said means for rasterizing to perform a function designated by said retrieved program code means, such that by retrieving the program code means in said instruction stream of the encapsulated execute buffer and generating controls in response to said retrieved program code means the three dimensional object defined by the vertices in said at least one vertex pool is rendered.

13. A method of rendering a three dimensional graphical object as recited in claim 12 wherein said encapsulated execute buffer resides in shared memory and access to said encapsulated execute buffer is achieved by reading said at least one vertex pool and said instruction stream from said shared memory.

14. A method of rendering a three dimensional graphical object as recited in claim 12 wherein said retrieved program code means comprises indices into said at least one vertex pool so that one or more of said means for coordinate transformation, said means for lighting, and said means for rasterizing can access one or more vertices of said at least one vertex pool.

15. A method of rendering a three dimensional graphical object as recited in claim 12 wherein said graphic subsystem comprises an internal vertex buffer and wherein as vertices from said at least one vertex pool are transformed by said means for coordinate transformation, said transformed vertices are placed in said internal vertex buffer.

16. A method of rendering a three dimensional graphical object as recited in claim 12 wherein said graphic subsystem comprises an internal vertex buffer and wherein as vertices from said at least one vertex pool are lit by said means for lighting, said lit vertices are placed in said internal vertex buffer.

17. A method of rendering a three dimensional graphical object as recited in claim 12 wherein said graphic subsystem comprises an internal vertex buffer and wherein vertices to be rasterized by said means for rasterizing are retrieved from said internal vertex buffer.

18. In a computer having a central processing unit (CPU), a subsystem for rendering a three dimensional object by processing encapsulated execute buffers formed by joining together at least one vertex pool comprised of a plurality of vertices which together define at least a portion of the object to be rendered and an instruction stream comprising program code means for controlling the execution of said graphic subsystem, said subsystem comprising:

means for implementing one or more graphical functions comprising at least one of coordinate transformation, object lighting and rasterizing;

means for accessing and retrieving vertices and program code means stored in an encapsulated execute buffer formed by joining together at least one vertex pool comprised of a plurality of vertices which together define at least a portion of an object to be rendered and an instruction stream comprising program code means for controlling said means for implementing in order to control the rendering of said object; and means for decoding said instruction stream and for controlling said means for implementing in response to said decoded instruction stream with respect to said at least one vertex pool, so that said means for implementing performs one or more of transformation, object lighting, and rasterizing in response to said instruction stream to render said object from said at least one vertex pool.

19. A subsystem as recited in claim 18 further comprising means for directly accessing said means for implementing so that said one or more graphical functions of said means for implementing may be accessed directly.

20. A subsystem as recited in claim 18 further comprising means for directly accessing said means for implementing so that parameters affecting the functioning of said means for implementing may be set through said means for directly accessing.

21. A subsystem as recited in claim 18 further comprising means for forming an internal vertex buffer that can be used by said means for implementing to store the results of said one or more graphical functions.

22. A subsystem as recited in claim 21 wherein the means for forming an internal vertex buffer comprises fast cache memory.

23. A subsystem as recited in claim 18 wherein said encapsulated execute buffer resides in memory accessible by both said graphical subsystem and said CPU and wherein said means for accessing and retrieving retrieves vertices and program code means stored in said encapsulated execute buffer from said memory.

24. A subsystem as recited in claim 18 wherein said means for implementing comprises means for coordinate transformation, means for object lighting and means for rasterizing.

25. In a computer having a central processing unit (CPU), a subsystem for rendering a three dimensional object by processing encapsulated execute buffers formed by joining together at least one vertex pool comprised of a plurality of vertices which together define at least a portion of the object to be rendered and an instruction stream comprising program code means for controlling the execution of said graphic subsystem, said subsystem comprising:

means for implementing one or more graphical functions comprising at least one of coordinate transformation, object lighting and rasterizing;

means for directly accessing said means for implementing so that said one or more graphical functions may be accessed directly through said means for directly accessing;

means for accessing and retrieving vertices and program code means stored in an encapsulated execute buffer formed by joining together at least one vertex pool comprised of a plurality of vertices which together define at least a portion of an object to be rendered and an instruction stream comprising program code means for controlling said means for implementing in order to control the rendering of said object; and means for decoding said instruction stream and for controlling said means for implementing in response to said decoded instruction stream with respect to said at least one vertex pool, so that said means for implementing performs one or more of transformation, object lighting, and rasterizing in response to said instruction stream to render said object from said at least one vertex pool.

26. A subsystem as recited in claim 25 wherein parameters affecting the functioning of said means for implementing may be set through said means for directly accessing.

27. A subsystem as recited in claim 26 wherein said encapsulated execute buffer resides in memory accessible by both said subsystem and said CPU and wherein said means for accessing and retrieving retrieves vertices and program code means stored in said encapsulated execute buffer from said memory.

28. A subsystem as recited in claim 27 further comprising means for forming an internal vertex buffer that can be used by said means for implementing to store the results of said one or more graphical functions.

29. A subsystem as recited in claim 28 wherein said means for forming an internal vertex buffer comprises fast cache memory.

30. A subsystem as recited in claim 28 wherein said means for implementing comprises means for coordinate transformation, means for object lighting and means for rasterizing.

31. A subsystem as recited in claim 30 wherein said means for coordinate transformation places vertices that have been transformed into said means for forming an internal vertex buffer.

32. A subsystem as recited in claim 31 wherein said means for object lighting places vertices that have been lit into said means for forming an internal vertex buffer.

33. A subsystem as recited in claim 32 wherein said means for rasterizing reads vertices to be rasterized from said means for forming an internal vertex buffer.

34. A computer-readable medium having computer-executable instructions comprising:

means for defining at least one vertex pool comprised of a plurality of vertices which together define at least a portion of a three dimensional graphical object to be rendered;

means for forming at least one encapsulated execute buffer by joining together an instruction stream with said at least one vertex pool so that the encapsulated execute buffer serves as a contained unit adapted for processing by means for implementing one or more graphical functions comprising at least one of coordinate transformation, object lighting and rasterizing, and wherein said instruction stream contains program code means for controlling the execution of one or more of said graphical functions with respect to said at least one vertex pool; and means for causing said execute buffer to be processed by said means for implementing so at to graphically render said three dimensional object.

35. A computer-readable medium as recited in claim 34 wherein said means for defining said at least one vertex pool selects vertices for inclusion into said at least one vertex pool from at least one substantially localized area in order to increase the amount of vertex sharing among the vertices of said at least one vertex pool.

36. A computer-readable medium as recited in claim 34 wherein said instruction stream comprises program code means that causes said means for implementing to change state by changing at least one parameter used by said one or more graphical functions.

37. A computer-readable medium as recited in claim 36 wherein said instruction stream is organized to minimize the number of state transitions caused by said instruction stream in said means for implementing by grouping together program code means that require a designated state for said means for implementing.

38. A computer-readable medium having executable-instructions comprising:

means for implementing one or more graphical functions comprising at least one of coordinate transformation, object lighting and rasterizing;

means for accessing and retrieving vertices and program code means stored in an encapsulated execute buffer formed by joining together at least one vertex pool comprised of a plurality of vertices which together define at least a portion of an object to be rendered and an instruction stream comprising program code means for controlling said means for implementing in order to control the rendering of said object; and means for decoding said instruction stream and for controlling said means for implementing in response to said decoded instruction stream with respect to said at least one vertex pool, so that said means for implementing performs one or more of transformation, object lighting, and rasterizing in response to said instruction stream to render said object from said at least one vertex pool.

39. A computer-readable medium as recited in claim 38 further comprising means for directly accessing said means for implementing so that said one or more graphical functions may be accessed directly through said means for directly accessing.

40. A computer-readable medium as recited in claim 39 wherein said means for directly accessing allows parameters affecting the functioning of said means for implementing to be set directly through said means for directly accessing.

41. A computer-readable medium as recited in claim 38 wherein said means for implementing comprises means for coordinate transformation.

42. A computer-readable medium as recited in claim 41 wherein said means for implementing further comprises means for object lighting.

43. A computer-readable medium as recited in claim 42 wherein said means for implementing further comprises means for rasterizing.

44. In a computer system having a central processing unit (CPU) and a means for implementing one or more graphical functions such as coordinate transformation, object lighting and rasterizing, a method of creating a data structure used to render and display a three dimensional object, the method comprising the steps of:

said CPU defining at least one vertex pool comprised of a plurality of vertices which together define at least a portion of the object to be rendered; and said CPU forming at least one encapsulated execute buffer by joining together an instruction stream with said at least one vertex pool so that the encapsulated execute buffer serves as a contained unit adapted for processing by said means for implementing, and wherein said instruction stream contains program code means for controlling the execution of one or more of said graphical functions with respect to said at least one vertex pool.

45. A method of creating a data structure as recited in claim 44 wherein the size of the at least one vertex pool is matched to the size of an internal vertex buffer of said means for implementing so that said at least one vertex pool can be stored in said internal vertex buffer.

46. A method of creating a data structure as recited in claim 44 wherein the vertices of said at least one vertex pool are selected from at least one substantially localized region in order to increase the vertex sharing among vertices of said at least one vertex pool.

47. In a computer system having a central processing unit (CPU) and a means for implementing one or more graphical functions such as coordinate transformation, object lighting and rasterizing, an object oriented execute buffer for processing by said means for implementing in order to render a three dimensional graphical object, said execute buffer comprising:

at least one vertex pool comprised of a plurality of vertices which together define at least a portion of a three dimensional object to be rendered by said means for implementing; and an instruction stream comprising program code means for controlling the execution of one or more of said graphical functions with respect to said at least one vertex pool in order to cause said means for implementing to render that portion of the object defined by said at least one vertex pool.

* * * * *

UNITED STATES PATENT AND TRADEMARK OFFICE
CERTIFICATE OF CORRECTION

PATENT NO. : 5,812,136
DATED : September 22, 1998
INVENTOR(S) : Servan Keondjian It is certified that error appears in the above-identified patent and that said Letters Patent is hereby corrected as shown below:

Column 1,
Line 53, after "objects" change "have" to -- has --

Column 8,
Lines 43-43, after "methods for" change "interpolating useful in drawing" to
-- usefully interpolating or drawing --

Column 13,
Line 30, after "instructions" change "set" to -- sets --

Column 14,
Line 54, after the second occurrence of "pool" change "increase" to -- increases --

Column 15,
Line 66, after "so" change "at" to -- as --

Column 16,
Line 52, after "so" change "at" to -- as --

Column 17,
Line 15, before "means" delete "of"
Line 27, before "means" delete "of"

Signed and Sealed this

Ninth Day of July, 2002

Attest:

Attesting Officer

JAMES E. ROGAN
Director of the United States Patent and Trademark Office